(12) United States Patent
Liu

(10) Patent No.: US 9,763,533 B2
(45) Date of Patent: Sep. 19, 2017

(54) BREWING VESSEL HAVING FLEXIBLE ASSEMBLY RING

(71) Applicant: Ming-Tung Liu, Taipei (TW)

(72) Inventor: Ming-Tung Liu, Taipei (TW)

( * ) Notice: Subject to any disclaimer, the term of this patent is extended or adjusted under 35 U.S.C. 154(b) by 460 days.

(21) Appl. No.: 14/574,559

(22) Filed: Dec. 18, 2014

(65) Prior Publication Data

US 2016/0174758 A1 Jun. 23, 2016

(51) Int. Cl.
*A47J 31/06* (2006.01)
*A47J 31/02* (2006.01)

(52) U.S. Cl.
CPC .............. *A47J 31/02* (2013.01); *A47J 31/061* (2013.01); *A47J 31/0605* (2013.01); *A47J 31/0615* (2013.01)

(58) Field of Classification Search
CPC ... A47J 31/061; A47J 31/0605; A47J 31/0615
USPC ................................................... 99/299, 306
See application file for complete search history.

(56) References Cited

U.S. PATENT DOCUMENTS

| | | | | |
|---|---|---|---|---|
| 8,033,212 B2* | 10/2011 | Liu | ........................ | A47J 31/02 99/306 |
| 9,055,836 B2* | 6/2015 | Liu | ....................... | A47J 31/061 |
| 2010/0218685 A1* | 9/2010 | Taylor | ..................... | A47J 31/02 99/288 |
| 2012/0160107 A1* | 6/2012 | Tien | ...................... | A47J 31/061 99/298 |

* cited by examiner

*Primary Examiner* — Reginald L Alexander
(74) *Attorney, Agent, or Firm* — Bacon & Thomas, PLLC

(57) ABSTRACT

The present invention is to provide a brewing vessel having a flexible assembly ring, which includes a vessel body having a brewing space therein and upper and lower openings in communication with the brewing space respectively, a base having a through hole passed therethrough and a ring wall upwardly and protrudingly disposed at a top thereof corresponding to the through hole, a flexible assembly ring capable of being deformed to sleeve onto the ring wall and having a plurality of abutting members disposed along the periphery of the outer surface thereof for watertightly abutting against the inner surface of the lower opening when the bottom of the vessel body is mounted on the top of the base. Thus, the vessel body and the base can be watertightly combined together by the flexible assembly ring, so gaps between the vessel body and the base can be fully filled with precision.

20 Claims, 7 Drawing Sheets

BREWING VESSEL HAVING FLEXIBLE ASSEMBLY RING

FIELD OF THE INVENTION

The present disclosure generally relates to a brewing vessel, more particularly to a brewing vessel having a flexible assembly ring, such that a vessel body and a base of the brewing vessel can be watertightly combined together by the flexible assembly ring, and gaps between the vessel body and the base can be fully filled with precision.

BACKGROUND OF THE INVENTION

Recently, with improvement in technology and life quality, more and more persons purchase new products depending on whether the products are cheap and fine, and have convenience, easy-use or security. Because of this change in market trend, the manufacturers in various businesses must repeatedly make efforts in researching newer and more improved products to satisfy the most consumers' demands. A drink vessel which can be seen everywhere in daily life is taken as example. Formerly, when the user wanted to drink tea or coffee brewed on the spot, the user must operate a brewing manner such as tea ball or filter paper, etc., to filter out the tea-leaves or coffee powder from the drink for further drinking easily. However, after the user brews the drink by such manner, the user must discard the tea ball immediately or place the tea ball or filter paper in a vessel; or else, the moisture remained in the tea ball or the filter paper may make ambient environment moist, and cause inconvenience for the user.

In view of the problems, an inventor developed a brewing vessel to enable the user to conveniently carry and quickly brew tea or coffee. Please refer to FIG. 1 and FIG. 2. The brewing vessel 1 is provided with an accommodating space 10 recessed at a top side thereof, and a through hole 13 and a plurality of assembly holes 18 at a bottom side thereof. A water-stop tray 2 is assembled at the bottom side of the brewing vessel 1, and provided with a plurality of protruding rods 21. The plurality of protruding rods 21 can be respectively inserted into the assembly holes 18 and reciprocated up and down in the assembly holes 18. The water-stop tray 2 is provided with a rod 23 at the central position thereof, the rod 23 can be inserted into the through hole 13, and a water-stop block 25 is assembled at a top end of the rod 23.

When the brewing vessel 1 is placed on a desktop and the water-stop tray 2 falls naturally, the plurality of protruding rods 21 are abutted against lower edges of the plurality of assembly holes 18, and the water-stop block 25 can completely shield the through holes 13 (such as the status shown in FIG. 1), whereby the liquid in the accommodating space 10 is hard to be flowed out from the through hole 13. When the brewing vessel 1 is placed on a cup, the water-stop tray 2 is abutted by the cup, so the plurality of protruding rods 21 are abutted against upper edges of the plurality of assembly holes 18. In this case, the water-stop block 25 is moved away the position where the water-stop block 25 shields the through hole 13, whereby the liquid in the accommodating space 10 is flowed out from the through hole 13. Therefore, by using the brewing vessel 1, the user can store the tea ball or coffee powder conveniently and does not worry that the liquid remained in the brewing vessel 1 may be flowed out.

Although the brewing vessel 1 can provide the user to place the tea ball or the coffee powder efficiently, however, as the plasticizer event and news about the food safety issues are glutted on media forums, the consumers pay more and more attention on food safety protection, and correspondingly doubt that the brewing vessel made of plastic or acrylic material does not have enough heat resistance. The brewing vessel 1 can also be made of glass, but when the brewing vessel 1 is designed in different modeling, the cost of glass manufacturing process may be increased and the yield rate may be impacted. Therefore, the inventor tries to design the brewing vessel 1 as a two-piece structure, i.e., the main part of the brewing vessel 1 for accommodating the drink is made of glass, and the handle portion and base portion is still made of plastic material, so as to facilitate the modeling design. Therefore, the consumers' doubt can be solved efficiently, the manufacturing cost can be controlled efficiently, and the manufacturer can use the vessel body with one design (no matter whether the material is glass) to incorporate with the bases with different designs, so as to product various brewing vessels in different appearances and feelings.

However, after the inventor performed practical tests, the inventor found that it is not easy to control tolerances of the vessel made of glass, so if the brewing vessel is designed as the two-piece structure, the drink is easily seeped out of the brewing vessel due to the seam of assembly, and such brewing vessel fails to provide the basic functions. The assembly precision can be further improved to make the brewing vessel in two-piece structure be tightly combined together, but the glass has significant characteristic of expanding with heat and contracting with cold, the connection portion of the brewing vessel is easy to crack due to the characteristic of expanding with heat when hot drink is poured quickly. Therefore, what is need is to design a new brewing vessel structure, so that the brewing vessel can be assembled in the "two-piece" structure and stability of assembly and easy-use of the brewing vessel can also be ensured, and the drink is prevented from being seeped out from the seams of assembly.

SUMMARY OF THE INVENTION

In view of the problems that the brewing vessel designed as the two-piece structure cannot be precisely assembled and may cause the drink to be easily seeped from the seams, the inventor designs the brewing vessel having a flexible assembly ring of the present disclosure based on a long-term practice experience and multiple tests, to provide a product structure which can be manufactured and assembled more easily and has better effect. Therefore, the user can brew various drinks more safely.

An objective of the present disclosure is to provide a brewing vessel having a flexible assembly ring. The brewing vessel includes a vessel body, a base, a flexible assembly ring, a water-stop seat and a water-retaining plug. The vessel body is provided with an upper opening disposed at a top thereof and a lower opening disposed at a bottom thereof, and the upper opening is communicated with the lower opening to form a brewing space inside the vessel body. The base is provided with a through hole passed therethrough and a ring wall upwardly protrudingly disposed at a top thereof corresponding to the through hole. A flow channel is formed between the inner surface of the ring wall and corresponds to the through hole. The flexible assembly ring has an inner diameter matching with an outer diameter of the ring wall and can be deformed to sleeve onto the ring wall, to enable the inner surface of the ring wall to watertightly abut against the outer surface of the ring wall. An outer diameter of the flexible assembly ring matches with the lower opening, and the flexible assembly ring is provided with a plurality of abutting members disposed along the periphery of the outer surface thereof, whereby the plurality of abutting members can be watertightly abutted against the inner surface of the vessel body near the bottom of the vessel body when the bottom of the vessel body is mounted on the top of the base. The water-stop seat is movably disposed at the bottom of the base, and respectively provided with a water-stop pillar and an opening disposed thereon and corresponding to the through hole. A diameter of the water-stop pillar is smaller than an aperture of the through hole to enable a top end of the water-stop pillar to be passed the through hole and inserted into the flow channel. The water-retaining plug can be positioned at the top end of the water-stop pillar, and a diameter of the water-retaining plug is larger than the aperture of the through hole. Therefore, the vessel body and the base can be watertightly combined together by the flexible assembly ring, so gaps between the vessel body and the base can be fully filled with precision.

Other objective of the present disclosure is to provide the base which is provided with a first assembly slot at the top thereof and a second assembly slot at the bottom thereof. The first assembly slot is communicated with the second assembly slot via the through hole, and a structure of the first assembly slot matches with a structure of the bottom of the vessel body, so that the first assembly slot can be fastened with the bottom of the vessel body, and the outer surface of the vessel body near the bottom of the vessel body can be abutted with the inner surface of the first assembly slot. Therefore, the vessel body can be combined with the base more firmly.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE PREFERRED EMBODIMENTS

Figure 1:
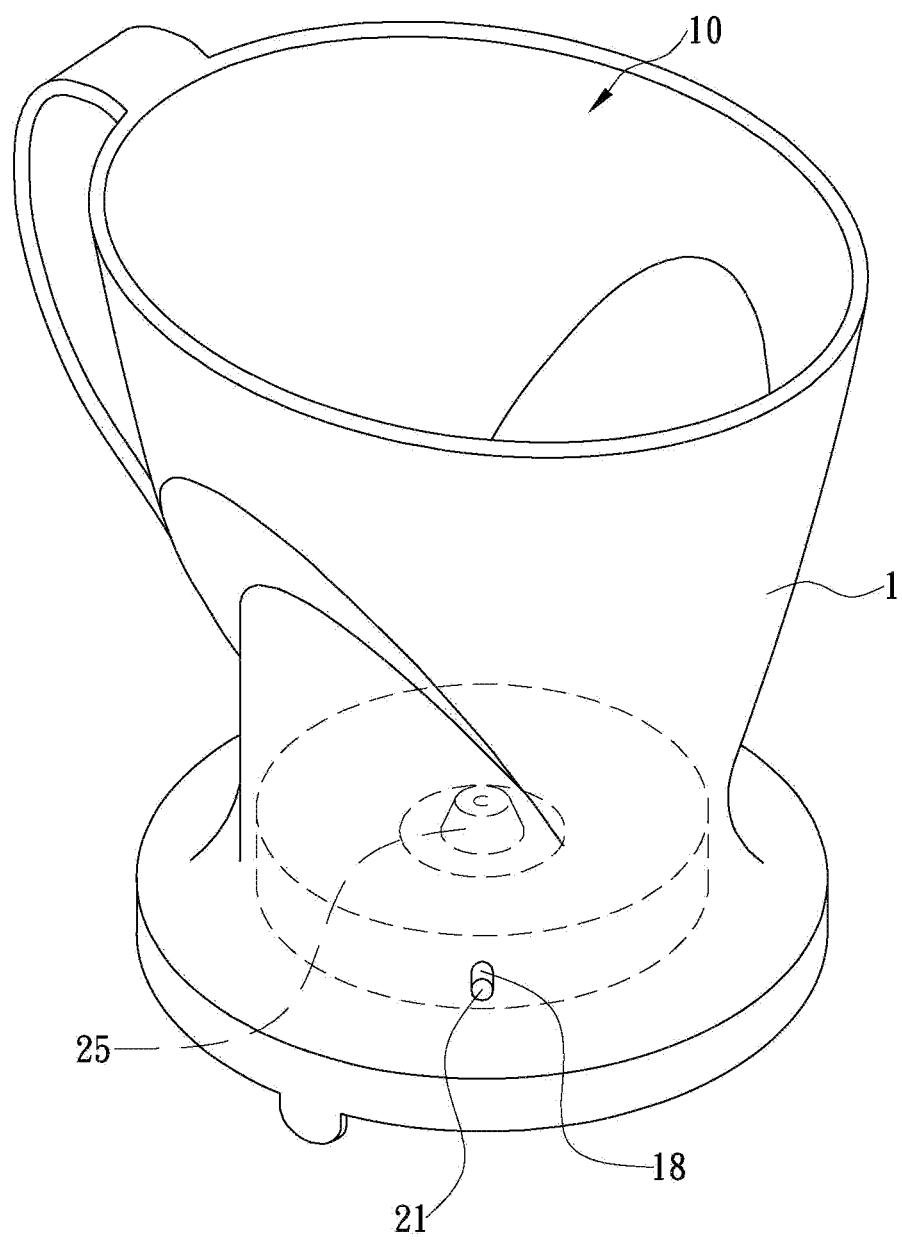
FIG. 1 is a schematic view of a traditional brewing vessel.
Figure 2:
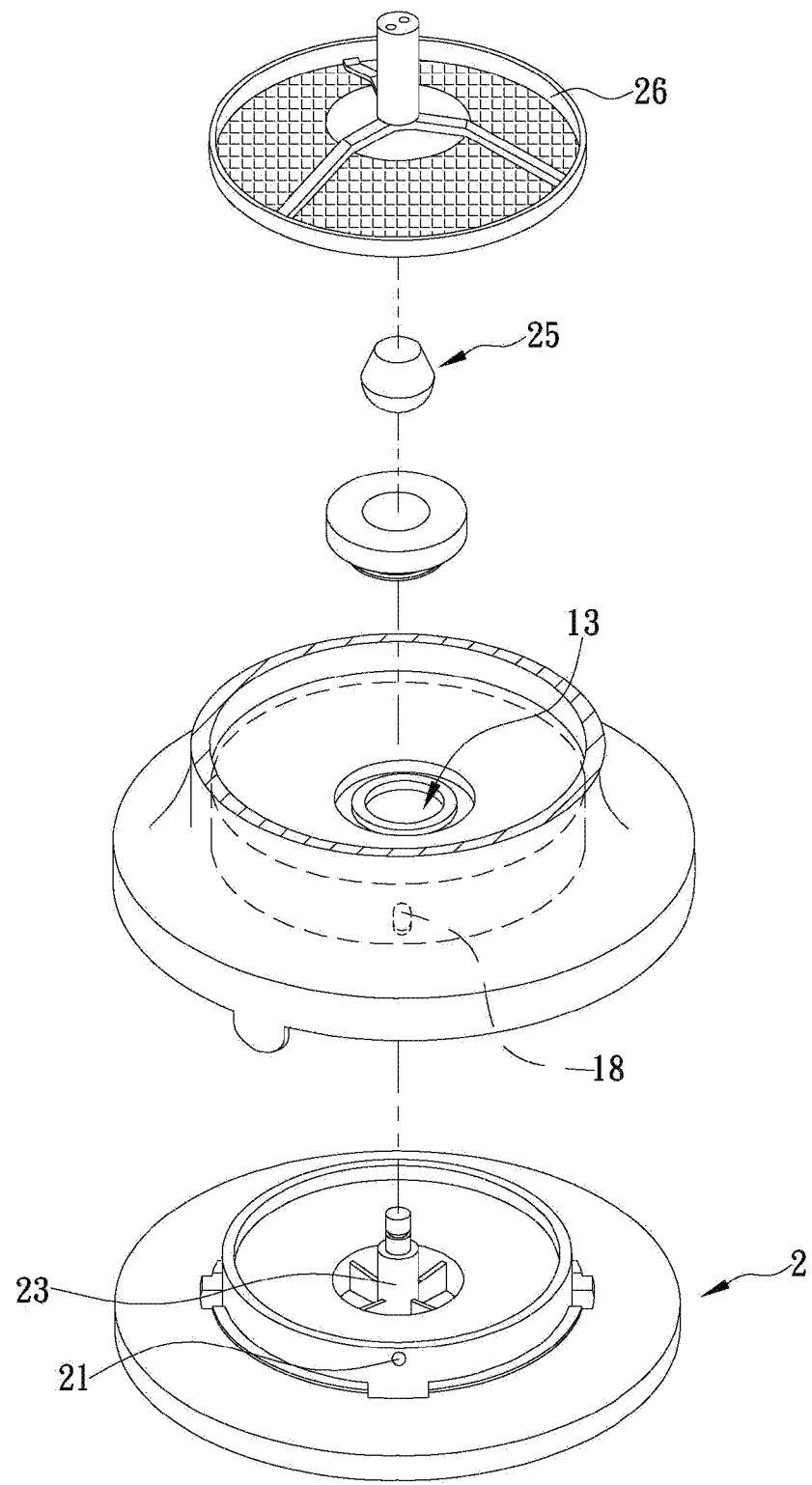
FIG. 2 is a schematic view of the traditional brewing vessel and a traditional water-stop tray.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

The present disclosure illustrates a brewing vessel having a flexible assembly ring. Please refer to FIG. 3 which shows a first preferred embodiment of the present disclosure. The brewing vessel 3 includes a vessel body 31, a base 32, a flexible assembly ring 33, a water-stop seat 34 and a water-retaining plug 343. The vessel body 31 is provided with an upper opening C1 disposed at a top thereof and a lower opening C2 disposed at a bottom thereof. The upper opening C1 is communicated with the lower opening C2 to form a brewing space 310 inside the vessel body 31. In this exemplary embodiment, the vessel body 31 is in a hollow cone shape, and made of glass or ceramic; however, it should be noted that in other embodiment of the present disclosure the structure and material of the vessel body 31 can be changed by the manufacturer.

Figure 3:
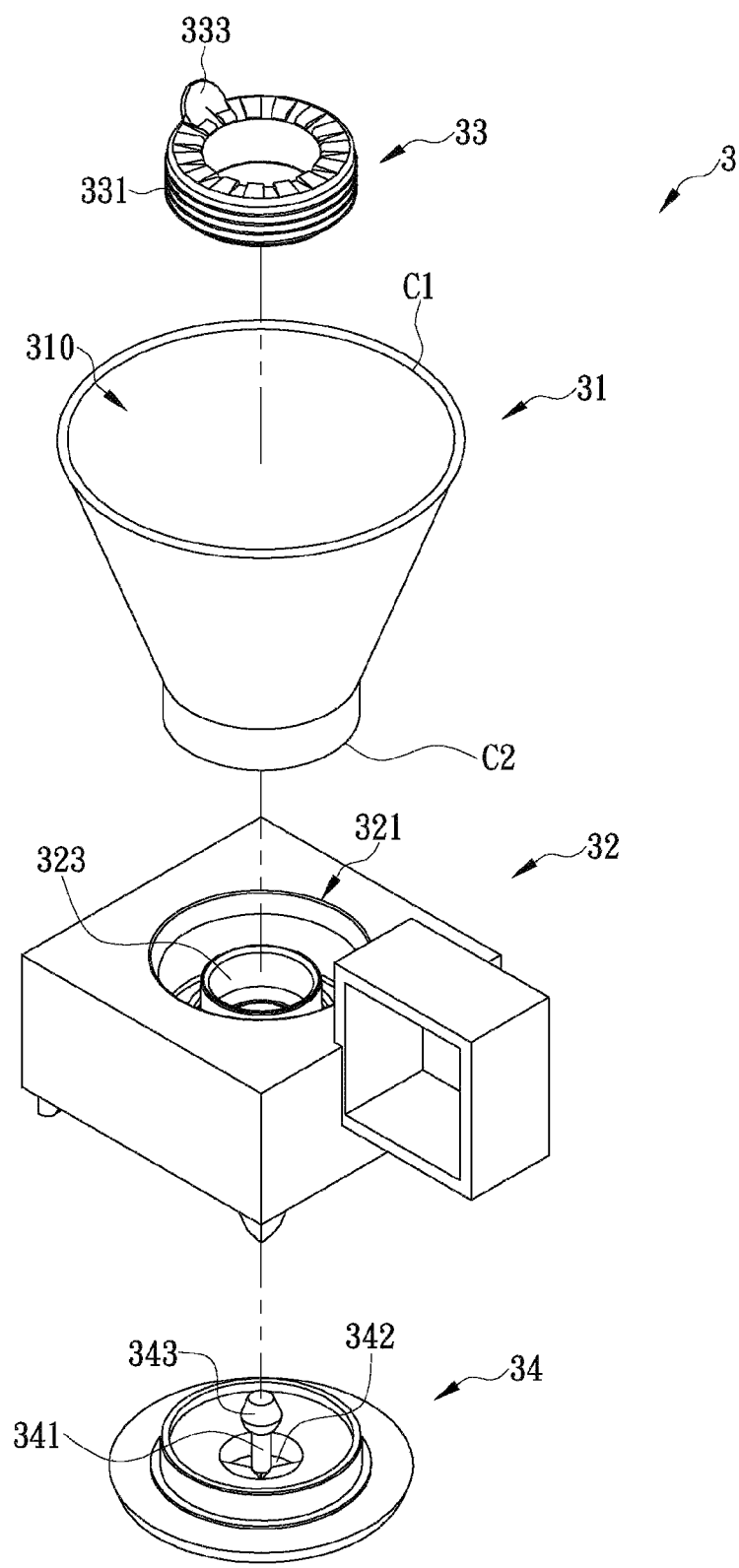
FIG. 3 is a schematic view of a preferred embodiment of a brewing vessel of the present disclosure.
Figure 4:
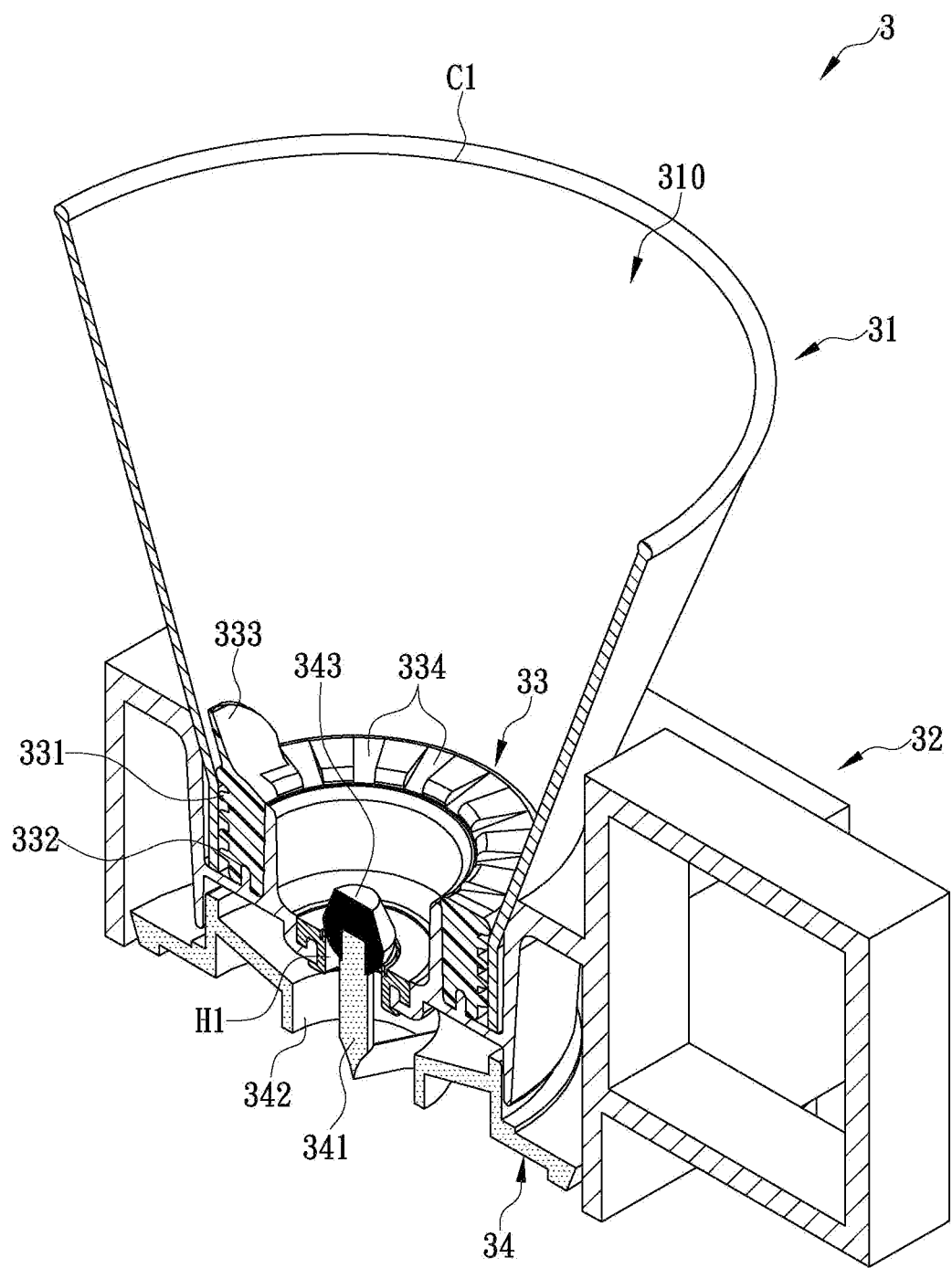
FIG. 4 is a structural schematic view of the brewing vessel of the present disclosure.
Figure 5:
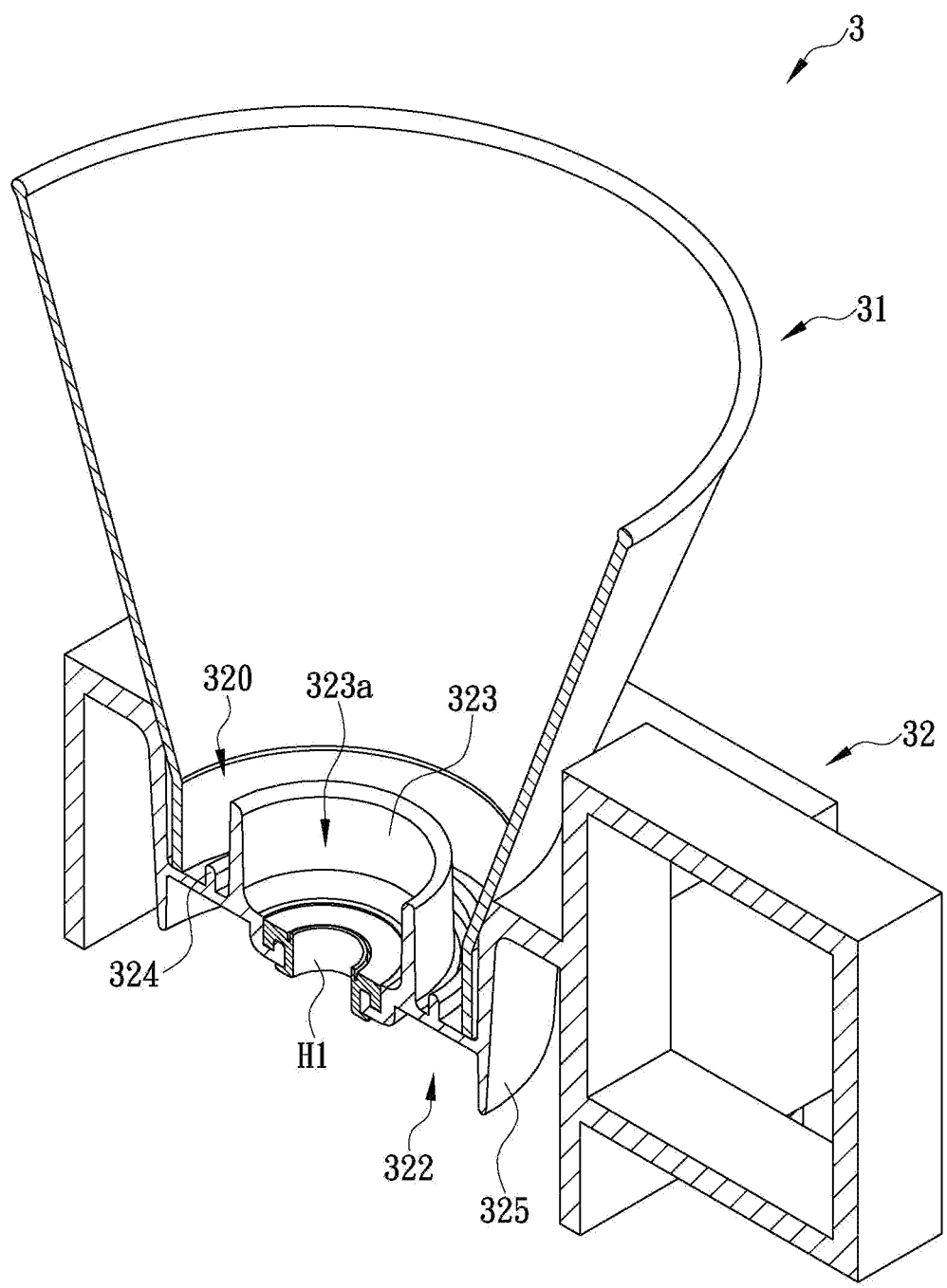
FIG. 5 is a structural schematic view of the vessel body and base of the present disclosure.
Figure 6:
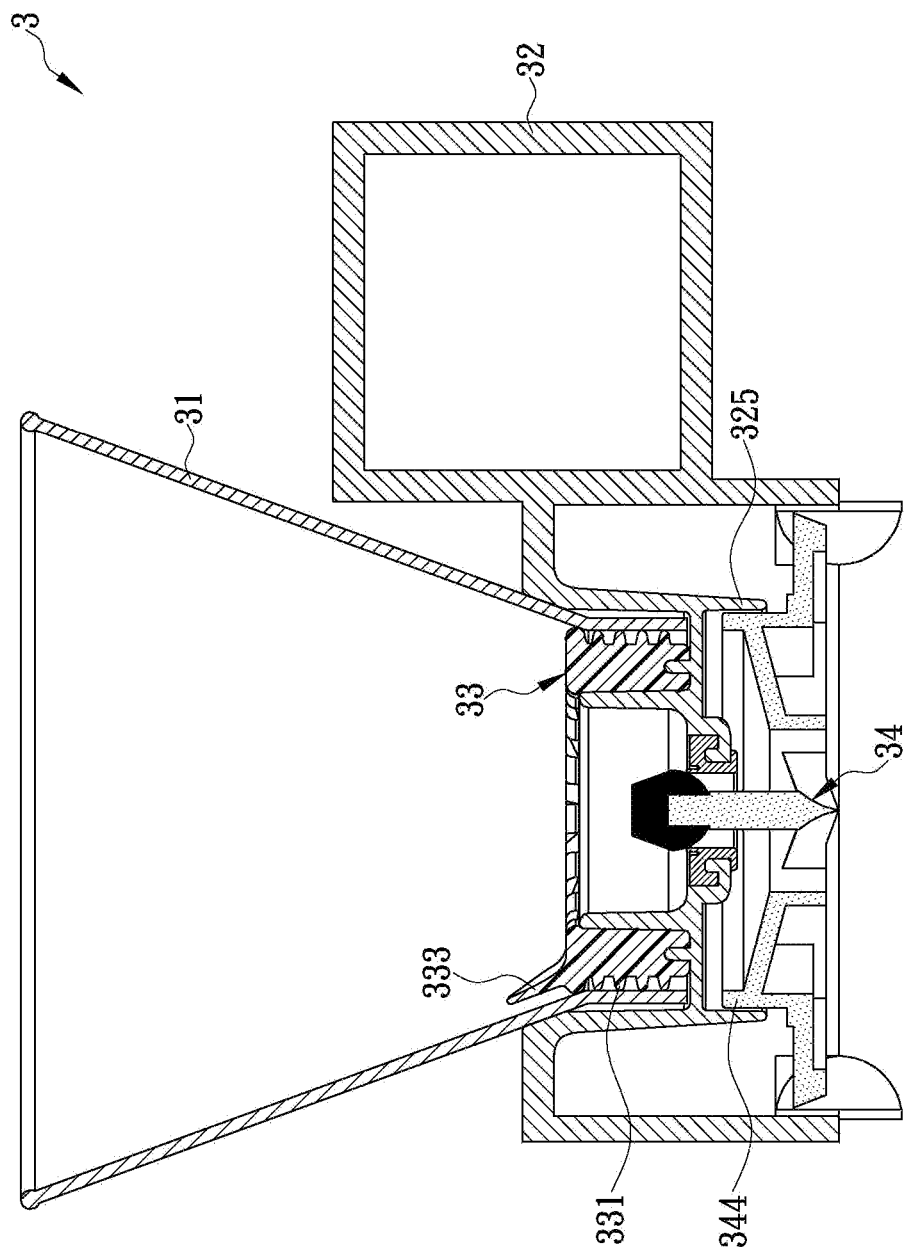
FIG. 6 is a section view of the brewing vessel of the present disclosure.

Please refer to FIG. 3 through FIG. 5. The FIG. 4 is a section view of the brewing vessel 3, and the FIG. 5 is a section view of the brewing vessel 3 in a condition that the flexible assembly ring 33 and the water-stop seat 34 are hidden. The base 32 is provided with a first assembly slot 321 disposed at the top thereof and a second assembly slot 322 disposed at the bottom thereof. The first assembly slot 321 is communicated with the second assembly slot 322 via the through hole H1. A structure of the first assembly slot 321 matches with that of the bottom of the vessel body 31, so that the first assembly slot 321 can be fastened with the bottom of the vessel body 31, to enable the outer surface of the vessel body 31 near the bottom of the vessel body 31 to be abutted with the inner surface of the first assembly slot 321. The first assembly slot 321 is provided with a ring wall 323 upwardly protrudingly disposed therein and corresponding to the first through hole H1. A flow channel 323a is formed between the inner surface of the ring wall 323 and corresponds to the through hole H1. The outer surface of the ring wall 323 is spaced apart from the inner surface of the vessel body 31 near the bottom of the vessel body 31 (or the inner surface of the first assembly slot 321) by a preset interval, so as to form an assembly space 320.

The flexible assembly ring 33 is made of elastic material (such as silica gel), and the structure of the flexible assembly ring 33 matches with the assembly space 320 (such as a caliber of the inner surface of the flexible assembly ring 33 is just smaller than that of the outer surface of the ring wall 323 a little, a caliber of the outer surface of the flexible assembly ring 33 is just larger than that of the lower opening C2 a little). When the bottom of the vessel body 31 is positioned in the first assembly slot 321, the flexible assembly ring 33 can be deformed to inset into the assembly space 320, to enable the outer surface of the flexible assembly ring 33 to watertightly abut against the inner surface of the vessel body 31 near the bottom of the vessel body 31, and enable the inner surface of the flexible assembly ring 33 to watertightly abut against the outer surface of the ring wall 323.

The water-stop seat 34 is movably disposed in the second group slot 322, and respectively provided with a water-stop pillar 341 and an opening 342 disposed thereon and corresponding to the through hole H1. A diameter of the water-stop pillar 341 is smaller than an aperture of the through hole H1 to enable a top end of the water-stop pillar 241 to be passed the through hole H1 and inserted into the flow channel 323a. The water-retaining plug 343 is disposed at the top end of the water-stop pillar 341 (the water-retaining plug 343 and the water-stop pillar 341 can be made integrally, or assembled by fastening). The water-retaining plug 343 can be made of elastic material, and a diameter of the water-retaining plug 343 is larger than the aperture of the through hole H1.

Accordingly, in a condition that the bottom of the water-stop seat 34 is not placed on the top edge of a cup (not shown FIGs), the water-retaining plug 343 can be moved downwardly to abut and seal up the through hole H1 due to a gravity of the water-stop seat 34 and a simultaneous action of the water-stop pillar 341, whereby a brewing liquid (such as coffee or tea) can be accommodated in the brewing space 310. Otherwise, in a condition that the bottom of the water-stop seat 34 is placed on the top edge of the cup, the water-stop seat 34 is abutted by the top edge of the cup, so that the water-stop pillar 341 is upwardly moved to drive the water-retaining plug 343 to upwardly move and depart from the through hole H1, whereby the liquid in the brewing space 310 can be passed the flow channel 323a, the through hole H1 and the opening 342 in order, and flowed into the cup.

In the brewing vessel 3, because the vessel body 31 and the base 32 are watertightly combined together, even if the vessel body 31 is made of glass and the structure thereof cannot be tightly and precisely combined with the base 32 which is made of acrylic material in in this exemplary embodiment, the flexible assembly ring 33 still can fully fill gaps between the vessel body 31 and the base 32. Accordingly, the manufacturer can produce the high-quality and sophisticated vessel body 31 by glass or ceramic and reassure some consumers' doubt about the acrylic material not having enough thermal resistance. The manufacturer also can produce various vessel bodies 31 having different structures (such as different patterns, color or heights) to incorporate with the base 32 having the same standard, so as to combine various brewing vessels 3 in different designs for sell.

It particularly mentions that in this exemplary embodiment the water-retaining plug 343 is disposed at the top end of the water-stop pillar 341 and moved with the water-stop pillar 341 together; however, in practice, the manufacturer also can design the water-retaining plug 343 and the water-stop pillar 341 as components independent to each other, i.e. the water-retaining plug 343 can be positioned on the through hole H1 independently. When the water-stop seat 34 is not placed on the top edge of the cup, the water-retaining plug 343 is spaced apart from the water-stop pillar 341 by an interval; after the water-stop seat 34 is placed on the top edge of the cup, the water-stop pillar 341 is upwardly moved to push the water-retaining plug 343 to be departed from the through hole H1. In this design, the water-retaining plug 343 is not limited to the elastic material, and also can be made of rigid material (such as a steel ball).

Please refer to FIG. 3 through FIG. 5. In this exemplary embodiment, the flexible assembly ring 33 is provided with a plurality of abutting members 331 disposed along the periphery of the outer surface thereof. A structure of each of the plurality of abutting members 331 is a plate and can be bent and deformed while being stressed, so that the flexible assembly ring 33 can be watertightly inset to the assembly space 320 more easily and abutted against the inner surface of the vessel body 31 near the bottom of the vessel body 31. Therefore, the vessel body 31 and the base 32 can be combined together firmly. Accordingly, even if the user pours hot water into the vessel body 31 and the vessel body 31 is expanded due to being heated, the flexible assembly ring 33 can provide a buffer space for expansion or contraction of the vessel body 31 via the plurality of abutting members 331, so as to ensure the durability of the brewing vessel 3.

In addition, the base 32 is provided with a first fastening part 324 disposed between the inner surface of the first assembly slot 321 and the outer surface of the ring wall 323, and the flexible assembly ring 33 is provided with a second fastening part 332 at the bottom thereof. A structure of the second fastening part 332 (such a protruded part) matches with a structure of the first fastening part 324 (such as a groove portion), so that the first fastening part 324 and the second fastening part 332 can be fastened with each other when the flexible assembly ring 33 is inset into the assembly space 220. Therefore, the watertightness of the flexible assembly ring 33 can be further improved.

Moreover, please refer to FIG. 4 and FIG. 5. The flexible assembly ring 33 is provided with a toe piece 333 at the top thereof. When the flexible assembly ring 33 is inset into the assembly space 320, the toe piece 333 can be exposed outside of the brewing space 310, whereby the user can exert a force to take out the flexible assembly ring 33 from the assembly space 320 by gripping the toe piece 333, for disassembling the combination of the vessel body 31 and the base 32, so as to facilitate the user's complete clean work for the vessel body 31, the flexible assembly ring 33 and the base 32 one by one.

In addition, please refer to FIG. 3 through FIG. 6. The second assembly slot 322 is provided with a first guiding wall 325 downwardly extended therein, the water-stop seat 34 is provided with a second guiding wall 344 upwardly protrudingly disposed at the top thereof, and a structure of the first guiding wall 325 matches with that of the second guiding wall 344 (in this exemplary embodiment, a diameter of an inner wall of the first guiding wall 325 is equal to a diameter of an outer wall of the second guiding wall 344). In a condition that the water-stop seat 34 is mounted in the second assembly slot 322, the second guiding wall 344 can be guided by the first guiding wall 325 to abut the first guiding wall 325 with each other, whereby the water-stop seat 34 can be moved up and down along the direction of the guiding wall 325 and 344.

The flexible assembly ring 33 is provided with a plurality of guiding gutters 334 concavely disposed at the top thereof, respectively. The plurality of guiding gutters 334 are spaced apart from each other by a preset distance, and uniformly distributed on the top surface of the flexible assembly ring 33. The plurality of guiding gutters 334 are inclined toward the direction of the flow channel 323a, so that the liquid in the brewing space 310 can be flowed into the flow channel 323a along a regular flow direction.

In addition, it particularly mentions that in above-mentioned embodiment, by tightly abutting between the water-retaining plug 343 and the through hole H1, the water-stop seat 34 can be prevented from being departed from the second assembly slot 322; however, in practical implementation, the manufacturer can also dispose stop components on the plurality of guiding walls 325 and 344, so as to improve stability of assembling the water-stop seat 34.

Figure 7:
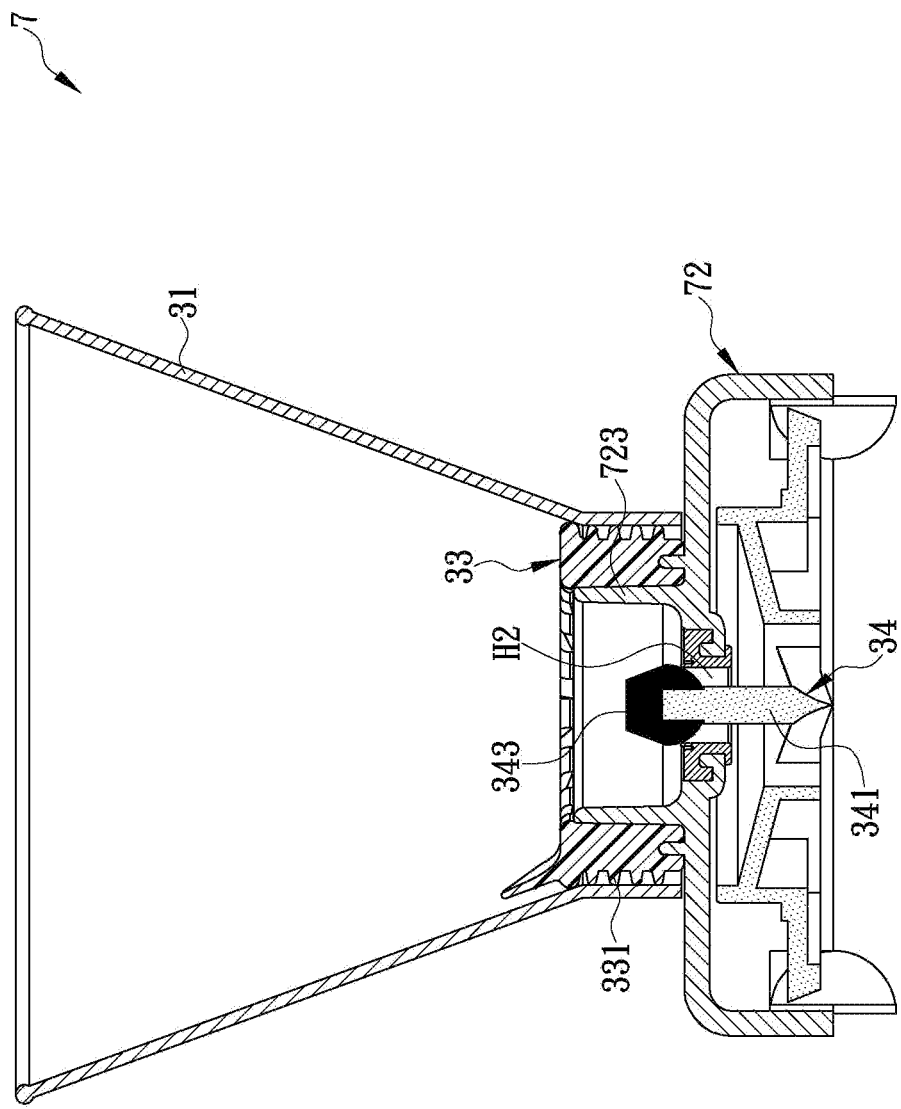
FIG. 7 is a schematic view of other preferred embodiment of the brewing vessel of the present disclosure.

In above-mentioned embodiment, the vessel body 31 and the water-stop seat 34 are respectively positioned in the first assembly slot 321 and the second assembly slot 322 of the base 32; however, the first assembly slot 321 and the second assembly slot 322 are not necessary features in implementation of the present disclosure. Please refer to FIG. 7 which shows another preferred embodiment of the present disclosure. The base 72 of the brewing vessel 7 is not designed to have the first assembly slot and the second assembly slot, but only have a through hole H2 and a ring wall 723 at the top thereof.

During assembly, the user can firstly mount the flexible assembly ring 33 on the ring wall 723 to enable the inner surface of the flexible assembly ring 33 to watertightly abut against the outer surface of the ring wall 723 due to flexibility deformation, and then mount the bottom of the vessel body 31 on the top of the base 72 to enable the bottom of the vessel body 31 to watertightly abut against the inner surface of the vessel body 31 near the bottom of the vessel body 31, by the flexibility deformation of the plurality of abutting members 331 of the outer edge of the flexible assembly ring 33. Finally, the user can position the water-stop seat 34 at the bottom of the base 72 by the fastening between the water-retaining plug 343 and the through hole H2. Accordingly, the vessel body 31, the base 72 and the flexible assembly ring 33 can be assembled together without using the first assembly slot and the second assembly slot.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A brewing vessel having a flexible assembly ring, comprising:
    a vessel body, provided with an upper opening disposed at a top thereof and a lower opening disposed at a bottom thereof, the upper opening communicated with the lower opening to form a brewing space inside the vessel body;
    a base, provided with a through hole passed therethrough and a ring wall upward protrudingly disposed at a top thereof corresponding to the through hole, a flow channel formed between the inner surface of the ring wall and corresponding to the through hole;
    a flexible assembly ring, having an inner diameter matching with an outer diameter of the ring wall, and being deformed to sleeve onto the ring wall, to enable the inner surface of the ring wall to watertightly abut against the outer surface of the ring wall, an outer diameter of the flexible assembly ring matching with the lower opening, and the flexible assembly ring provided with a plurality of abutting members disposed along the periphery of the outer surface thereof, whereby the plurality of abutting members can be watertightly abutted against the inner surface of the vessel body near the bottom of the vessel body when the bottom of the vessel body is mounted on the top of the base;
    a water-stop seat, movably disposed at the bottom of the base, and respectively provided with a water-stop pillar and an opening disposed thereon and corresponding to the through hole, a diameter of the water-stop pillar smaller than an aperture of the through hole to enable a top end of the water-stop pillar to be passed the through hole and inserted into the flow channel; and
    a water-retaining plug, positioned at the top end of the water-stop pillar, and a diameter of the water-retaining plug larger than the aperture of the through hole.

2. The brewing vessel as defined in claim 1, wherein the base is provided with a first assembly slot at the top thereof and a second assembly slot at the bottom thereof, the first assembly slot is communicated with the second assembly slot via the through hole, and a structure of the first assembly slot matches with a structure of the bottom of the vessel body, so that the first assembly slot can be fastened with the bottom of the vessel body, and the outer surface of the vessel body near the bottom of the vessel body can be abutted with the inner surface of the first assembly slot.

3. The brewing vessel as defined in claim 2, wherein the base is provided with a first fastening part between the inner surface of the first assembly slot and the outer surface of the ring wall, the flexible assembly ring is provided with a second fastening part at the bottom thereof, a structure of the second fastening part matches with a structure of the first fastening part, so that the first fastening part and the second fastening part can be fastened with each other when the flexible assembly ring is deformed to sleeve onto the ring wall.

4. The brewing vessel as defined in claim 3, wherein the second assembly slot is provided with a first guiding wall therein, the water-stop seat is provided with a second guiding wall upwardly protrudingly disposed at the top thereof, and in a condition that the water-stop seat is mounted into the second assembly slot, the second guiding wall is guided by the first guiding wall to enable the water-stop seat to move up and down at the bottom of the base along a direction of the first guiding wall and the second guiding wall.

5. The brewing vessel as defined in claim 1, wherein material of the vessel body is glass or ceramic.

6. The brewing vessel as defined in claim 2, wherein material of the vessel body is glass or ceramic.

7. The brewing vessel as defined in claim 3, wherein material of the vessel body is glass or ceramic.

8. The brewing vessel as defined in claim 4, wherein material of the vessel body is glass or ceramic.

9. The brewing vessel as defined in claim 5, wherein the flexible assembly ring is provided with a plurality of guiding gutters radially concavely disposed at the top thereof, the plurality of guiding gutters are inclined toward the flow channel.

10. The brewing vessel as defined in claim 6, wherein the flexible assembly ring is provided with a plurality of guiding gutters radially concavely disposed at the top thereof, the plurality of guiding gutters are inclined toward the flow channel.

11. The brewing vessel as defined in claim 7, wherein the flexible assembly ring is provided with a plurality of guiding gutters radially concavely disposed at the top thereof, the plurality of guiding gutters are inclined toward the flow channel.

12. The brewing vessel as defined in claim 8, wherein the flexible assembly ring is provided with a plurality of guiding gutters radially concavely disposed at the top thereof, the plurality of guiding gutters are inclined toward the flow channel.

13. The brewing vessel as defined in claim 9, wherein the water-retaining plug is assembled at the top end of the water-stop pillar by fastening.

14. The brewing vessel as defined in claim 10, wherein the water-retaining plug is assembled at the top end of the water-stop pillar by fastening.

15. The brewing vessel as defined in claim 11, wherein the water-retaining plug is assembled at the top end of the water-stop pillar by fastening.

16. The brewing vessel as defined in claim 12, wherein the water-retaining plug is assembled at the top end of the water-stop pillar by fastening.

17. The brewing vessel as defined in claim 13, wherein the flexible assembly ring is provided with a toe piece at the top thereof.

18. The brewing vessel as defined in claim 14, wherein the flexible assembly ring is provided with a toe piece at the top thereof.

19. The brewing vessel as defined in claim 15, wherein the flexible assembly ring is provided with a toe piece at the top thereof.

20. The brewing vessel as defined in claim 16, wherein the flexible assembly ring is provided with a toe piece at the top thereof.

\* \* \* \* \*